RESYNCHRONIZER CIRCUIT FOR PRINTING TELEGRAPH RECEIVER

Filed Sept. 20, 1963

INVENTOR
FRANK D. BIGGAM
BY R. C. Terry
ATTORNEY

United States Patent Office 3,322,896
Patented May 30, 1967

3,322,896
RESYNCHRONIZER CIRCUIT FOR PRINTING TELEGRAPH RECEIVER

Frank D. Biggam, Deerfield, Ill., assignor to Teletype Corporation, Skokie, Ill., a corporation of Delaware Filed Sept. 20, 1963, Ser. No. 310,344
10 Claims. (Cl. 178—53.1)

ABSTRACT OF THE DISCLOSURE

A circuit for controlling the cyclic restarting of a start-stop telegraph receiver having a one-shot multivibrator which inserts a stop signal into the incoming signal train at the end of reception of each character and further having a bistable multivibrator responsive to the signal on the line and the output of the one-shot multivibrator for prolonging the duration of the inserted stop signal if the line signal is not a stop signal at the end of the timing period of the one-shot multivibrator.

In the normal operation of start-stop telegraph receivers a stop pulse occurs at the end of each character cycle and the receiver remains in an idle condition so long as the telegraph line remains in the marking state or condition, which characterizes the stop synchronizing pulse. These receivers then restart on the next transition of the telegraph line from the marking condition to the spacing condition (the latter characterizing the start synchronizing pulse). If, for any reason, the telegraph line is in a spacing condition at the end of a character cycle, the receiver will immediately restart with no chance of being in synchronism; or if the telegraph line goes marking, because of circuit interference, obliterating a start pulse, the receiver will restart on an information spacing pulse with no chance of synchronism.

It is an object of the present invention to provide methods and apparatus for facilitating the resynchronization of telegraph receivers which have lost synchronism.

It is a further object of this invention to provide methods and apparatus for preventing the immediate restarting of a character cycle, when the telegraph line is not in that condition which characterizes the stop pulse.

In accordance with one embodiment of the present invention as applied to an electronic start-stop telegraph receiver there is provided means for sensing the presence of a spacing condition on the telegraph line at a time when the receiving terminal should receive a marking stop pulse or bit. If a spacing condition exists on the line when a stop bit is expected, the receiving terminal is prevented from restarting until a marking condition again occurs on the line followed by a spacing condition. The likelihood of starting in synchronism with incoming signals is much greater if the receiver starts in step with the bits of transmission on a mark-to-space transition rather than at some random point in a spacing pulse. Thus, if the receiver starts on a proper type of telegraph pulse, it is more likely to be in phase with the received character.

The present invention and its objects will be more fully understood from the following description considered in conjunction with the accompanying drawings wherein.

Figure 1:
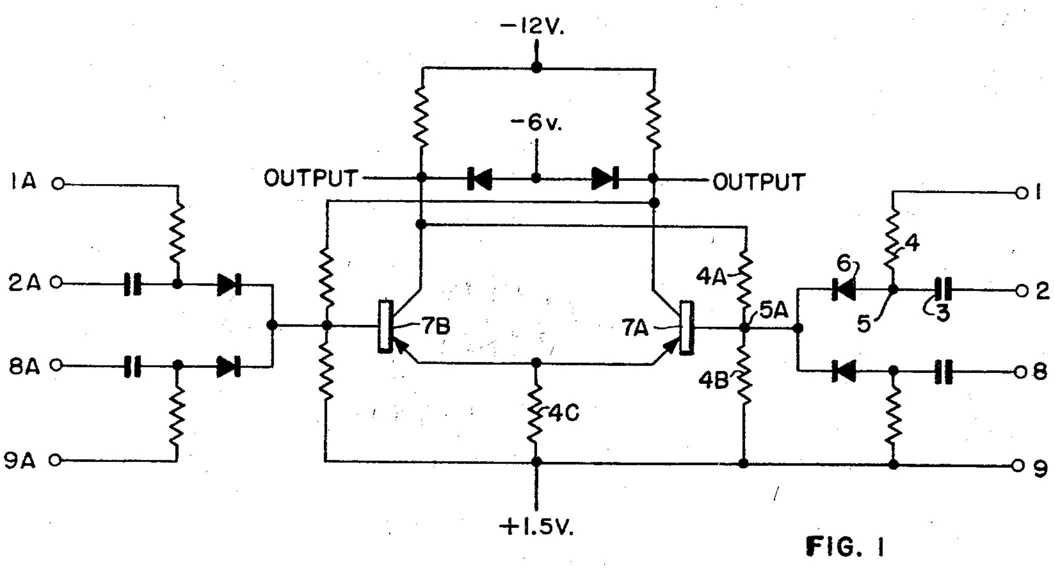
FIG. 1 is a diagram of a binary circuit containing examples of a gating circuit used in the particular embodiment described herein.

In the drawings, there is illustrated an electronic embodiment consisting of bistable multivibrators and monostable multivibrators which condition each other for later triggering of several binaries (bistable or monostable) simultaneously. It is necessary that gates be provided in association with each binary which are capable of accepting a conditioning input and successfully triggering their associated binaries even though the triggering pulse arrives simultaneously with the removal of the conditioning input. A typical bistable multivibrator or binary containing four such gates, two on each side of the binary, is shown schematically in FIG. 1. The bistable multivibrators 13, 15, 16, 17, 18, 26 and 37 may be of this type.

As an example of the operation of this type of gate a mark will be represented by 0 volts D.C. and a space will be represented by −6 volts D.C. If a mark (0 volts) is applied to point 1 and a space (−6 volts) is applied to point 2, the RC circuit composed of capacitor 3 and resistor 4 will assume a steady state with 0 volts appearing at point 5 and −6 volts appearing at point 2, with a voltage across capacitor 3 of 6 volts. To trigger the binary, the voltage at point 2 must experience a step-change from −6 volts to 0 volts (space-to-mark transition). Since the voltage across the capacitor cannot change instantaneously and since 0 volts appear at point 2, +6 volts must appear at point 5. This positive voltage at point 5 will then cause a pulse of trigger current to flow through diode 6 into the base of transistor 7A. If transistor 7A is conducting at this time the trigger current overcomes the base bias of transistor 7A turning it off. If the transistor 7A is not conducting, it will remain nonconductive. The circuit composed of transistors 7A and 7B with their associated collector and base bias resistors comprises a bistable multivibrator well known in the prior art.

If a space (−6 volts) appears at point 1 and also at point 2, there will be no voltage differences across the capacitor 3 and point 5 will assume a −6 volt potential. The potential at point 5A is approximately +.5 volt derived by resistors 4A, 4B, and 4C and conducting transistor 7A. Diode 6 is therefore reverse biased 6.5 volts. A change from −6 volts to 0 volts at point 2 will result in 0 volts appearing at point 5. This voltage is not enough to forward-bias diode 6 and there will be no trigger current available to trigger the binary. The signal appearing at point 1 is hereinafter referred to as the priming signal or prime and the space-to-mark transition affecting point 2 will be called the set signal or set.

One of the priming inputs of the gate may be permanently connected to a terminal supplying 0 volts or a slightly positive voltage as shown at 9. This provides a continuous printing signal so that space-to-mark transition occurring at point 8 will set the binary.

Figure 2:
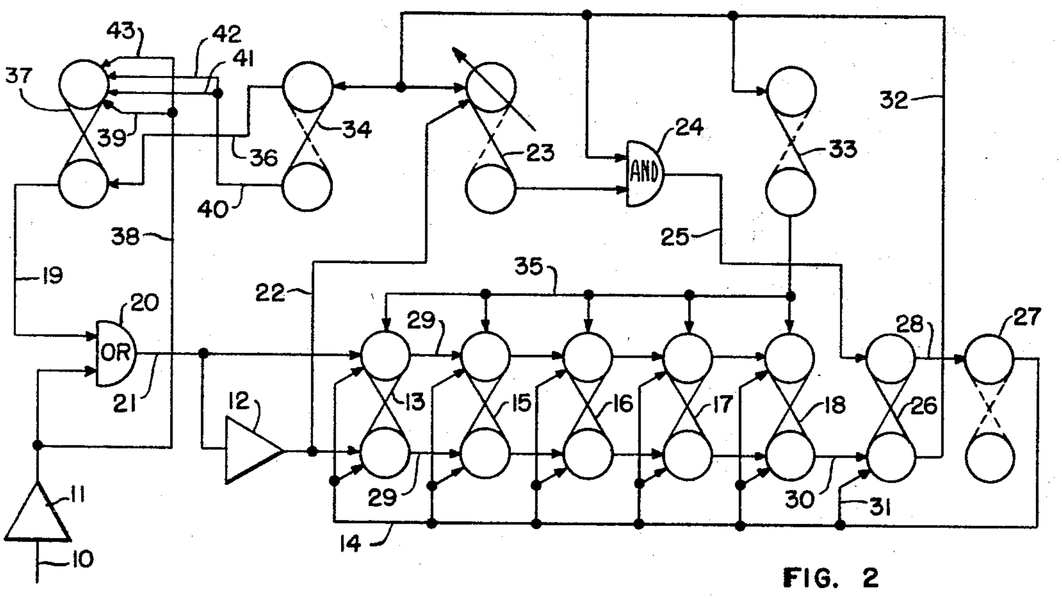
FIG. 2 shows an electronic receiving terminal equipped with circuitry to resynchronize it.

Referring now to FIG. 2, an electronic receiving circuit is shown. During an idle period on a telegraph line or toward the end of a stop pulse, a marking condition exists on a conductor 10, which may be 0 volts or any other arbitrary representation of a mark; and a spacing condition, −6 volts, exists on conductor 19 from the output of binary 37. Amplifier 11 converts the mark and space signals of line 10 to signals compatible with the components of the receiving circuit. OR-gate 20 will produce a marking condition on conductor 21 whenever a marking condition exists on either conductor 10 or conductor 19. During this idle period, the marking condition on conductor 10 causes a marking condition to exist on conductor 21 which is connected to one of the priming inputs of binary 13 (for example, terminal 1 of the binary shown in FIG. 1). Amplifier 12 is an inverting amplifier which inverts the marking condition (0 volts) on conductor 21 and provides a spacing condition (−6 volts) to another priming terminal of binary 13 (terminal 1A of the binary shown in FIG. 1). This spacing condition issuing from amplifier 12 is also carried on conductor 22 to the trigger terminal of the adjustable, range-control monostable multivibrator 23. The normally marking output of range control 23 goes to AND-gate 24 which will produce a marking condition on conductor 25 whenever its two inputs are marking. Conductor 32, during the idle period, provides a marking condition to the other input of AND-gate 24, and also primes the input of monostable multivibrator 23, so that conductor 25 is in a marking condition.

During receipt of a character, conductor 14 carries set signals to bistable multivibrators 13, 15, 16, 17, 18 and 26. These binaries are in their idle marking condition during the idle-line period. These set signals are directed to terminals 2 and 2A of the binary illustrated in FIG. 1. During the idle period of the telegraph line, conductor 14 is in the spacing condition (−6 volts) which issues from the output terminal of start-stop oscillator bit timer 27 during its idle condition. Bit timer 27 is idle whenever −6 volts exist on conductor 28 which is connected to an output of bit timer control flip-flop 26.

The end of the marking idle condition and the beginning of a spacing condition on line 10 (a mark-to-space transition) signifies the beginning of receipt of a character and must initiate a cycle of the receiving circuit.

Since telegraph signals at the receiving terminal are sometimes distorted to the point that their transitions are exceedingly sloped, amplifier 11 is used to "square up" these gradual transitions as well as to make the signals compatible with the receiver. No inversion occurs in amplifier 11, and its output (now a space) passes through OR-gate 20 (since both inputs are now space), and removes the prime from the upper side of binary 13, and passes through inverting amplifier 12 to cause the opposite condition (a mark) to be primed into the other side of binary 13. Thus, the lower side of binary 13 is primed to permit a set signal to pass while the upper side is unprimed so as to prevent a set signal from passing.

The inverted line signal passes over conductor 22 and the space-to-mark transition contained therein sets adjustable monostable multivibrator 23. Monostable multivibrator 23 has been primed by a marking condition on conductor 32 which exists during the idle period or stop pulse. Therefore, the set signal arriving over conductor 22 succeeds in setting monostable multivibrator 23 to its quasi-stable state. Monostable multivibrator 23 then sends a spacing signal to AND-gate 24. This causes conductor 25 to go spacing.

The monostable multivibrator 23 performs the ranging function common to telegraph receivers in that its positions the sampling set signals from bit timer 27 to occur during those portions of the telegraph signal least likely to be distorted. When monostable multivibrator 23 returns to its stable state, its output changes from space to mark. This transition passes through AND-gate 24 and over conductor 25 to set binary 26 to its marking condition (0 volts on conductor 28). Binary 26 is always primed to receive set signals over conductor 25 (input terminal 8 in FIG. 1). Binary 26, over conductor 28, controls bit timer 27 which is enabled by a signal of 0 volts on conductor 28. Bit timer 27, so long as it is enabled, transmits a square wave of a suitable frequency over conductor 14. This square wave provides set signals for the entire shift register (composed of bistable multivibrators, 13, 15, 16, 17, and 18) and also for the spacing side of binary 26. While bistable multivibrator 26 is in its marking condition, a spacing condition exists on conductor 32.

When bit timer 27 is first enabled, the start bit still exists on the telegraph line and binary 13 is primed to receive the start bit. Therefore, the first suitable set signal from bit timer 27 sets binary 13 in response to the spacing start bit.

In the middle of the No. 1 code bit, bit timer 27 again sends a set signal over conductor 14. Binary 13 has primed binary 15 over conductor 29 so that upon this second set signal, binary 15 now assumes the spacing start bit and binary 13 assumes the No. 1 bit, whether marking or spacing. The next set signal on conductor 14 advances the spacing start bit to binary 16 and advances the No. 1 bit to binary 15; and since the No. 2 bit is now being received, it is set into binary 13.

When the No. 3 code bit exists on the telegraph line, the fourth set signal over conductor 14 advances the spacing start bit from binary 16 to binary 17, the No. 1 bit from binary 15 to binary 16, the No. 2 bit from binary 13 to binary 15 and sets the No. 3 bit into binary 13. During the period that the No. 4 bit exists on the telegraph line, the next set signal on conductor 14 sets the spacing start bit into binary 18, the No. 1 bit into binary 17, the No. 2 bit into binary 16, the No. 3 bit into binary 15, and the No. 4 bit into binary 13.

When the fifth and last code bit exists on the telegraph line, the last set signal on conductor 14 sets this last bit into binary 13 and advances all the other bits forward. In addition, the spacing start bit has primed the spacing side of binary 26 over conductor 30. Since the initial condition of the binaries in the shift register had been marking, this was the first time that binary 26 had been primed to its spacing condition. Therefore, all prior set signals occuring on conductor 14 and passing through conductor 31 had failed to set binary 26 to its spacing condition. However, since the spacing condition had existed in binary 18 from the spacing start bit, binary 26 is now set to its spacing condition by this last set signal on conductor 31. This disables bit timer 27.

When binary 26 is set to its spacing condition, a space-to-mark set signal passes over conductor 32 and sets mono-stable multivibrator 33 to its quasi-stable state, producing a spacing condition on conductor 35. Monostable multivibrator 33 is primed at all times. The marking condition that exists on conductor 32 also conditions AND-gate 24 to pass the next set signal from monostable multivibrator 23 and also primes monostable multivibrator 23 to respond to the next mark-to-space set signal from the telegraph line over conductor 10 via OR-gate 20. At the same time, this space-to-mark set signal on conductor 32 sets monostable multivibrator 34 to its quasi-stable state. Monostable multivibrator 34 is also primed at all times.

After a short duration, monostable multivibrator 33 returns to its stable state, and its output produces a space-to-mark set signal on conductor 35. This set signal on conductor 35 resets each binary of the shift register to the marking condition through a permanently primed auxiliary input on each binary (such as terminal 8 in FIG. 1). The short interval determined by monostable multivibrator 33 allows the character just received to be transferred from the shift register to the recorder or any other equipment which is to utilize this character.

When monostable multivibrator 34, an interval timer, is set to its quasi-stable state, a space-to-mark set signal passes over conductor 36 and sets binary 37 to its marking condition through a gate which is primed at all times. The output of the binary 37, passing over conductor 19, impresses a marking condition on the second input of OR-gate 20.

Thus, as long as binary 37 is in its marking condition, the receiver will not respond to a spacing bit on the line.

Figure 3:
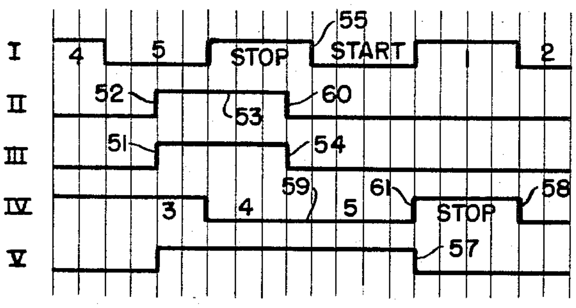
FIG. 3 is a set of timing diagrams showing the timing of the operation of receiving terminals with and without the resynchronizer.

FIG. 3 shows signal wave forms I, II, III, IV and V of which wave forms II and II are associated with stop inserter 34 and binary 37, respectively. These signal wave forms are related to a typical telegraph signal wave form I appearing on conductor 10. Transition 52 in wave form II is the transition of monostable multivibrator 34 from its stable to its quasi-stable state; and because monostable multivibrator 34 in going to its quasi-stable state set binary 37 to marking, as stated above, transition 51 in wave form III occurs at the same time as transition 52. This occurs at the same time as the last set signal issuing from bit timer 27. During the period represented by dwell or state 53, monostable multivibrator 34 is in its quasi-stable state. If during that period the marking stop bit is received over conductor 10, a prime signal will pass over conductor 38 and will prime binary 37 at priming terminal 39. When monostable multivibrator 34 returns to its stable state (transition 60), a set signal will pass over conductor 40 and set binary 37 to spacing at set terminal 41. This is shown in wave form III as transition 54. With binary 37 in its spacing condition, a spacing signal will now pass over conductor 19 to OR-gate 20; but since conductor 10 is in its marking condition the incoming marking stop bit still appears on conductor 21. Therefore, if the mark-to-space transition 55 for the start signal occurs on conductor 10 after transitions 60 and 54 of monostable multivibrator 34 and binary 37 respectively, a mark-to-space transition will then occur on conductor 21. As shown previously, this initiates the operation of a cycle of the receiver.

However, if the signal received on conductor 10 has a waveform such as IV, and is in spacing condition (state 59 in FIG. 3) when monostable multivibrator 34 returns to its stable state (transition 60), binary 37 is unprimed at its prime terminal 39. Therefore, the set signal over conductor 40 does not set binary 37 to its spacing condition, but merely primes an auxiliary priming input 42. The next space-to-mark transition occuring on conductor 10, transition 61, sends a set signal over conductor 38 and sets binary 37 to its spacing condition through auxiliar set input 43. This transition of binary 37 appears as transition 57 in waveform V. With a spacing condition existing on conductor 19, the next mark-to-space transition occurring on conductor 10, shown as transition 58 on waveform IV then initiates operation of a cycle of the receiver.

It will be seen that the marking condition imposed on conductor 21 as a result of the operation of monostable multivibrator 34 will be prolonged by binary 37 if, at the time that monostable multivibrator 34 seeks, through binary 37, to terminate the inserted stop passing over conductor 19, the line 10 is spacing. Subsequent return of the line 10 to marking causes, through binary 37, removal of the marking condition from conductor 19, so that conductor 21 can go to spacing when conductor 10 next goes to spacing. The sole purpose of binary 37 is to render the input circuit of the receiver insensitive to the telegraph line if a spacing condition exists on the line at the time when the receiver is prepared to receive the marking stop bit after monostable multivibrator 34 has timed out.

The designations applied to the signal bits in waveform IV indicate re-establishment of the proper operative relationship between incoming signals and the starting of the receiving distributor, namely, the starting of the distributor in response to the mark-to-space transition of the start signal. It will be understood that initiation of a cycle of the receiving distributor after it has lost synchronism due to failure to receive a stop signal will not necessarily coincide with the beginning of the start signal. It may coincide with any mark-to-space transition terminating any marking bit. The important consideration is that it does coincide with a mark-to-space transition and will more quickly come into coincidence with the beginning of the start signal as successive code combinations are received than it would be likely to do when the control afforded by monostable multivibrator 34 and binary 37 is absent, and the receiving distributor is thus enabled to start a new receiving cycle immediately following termination of a cycle if, at the time of such termination, the signal condition on the incoming line is spacing.

Although the embodiment described herein makes provision for only five character-determining or code bits, many more code bits can be accommodated by merely inserting additional binaries between binaries 18 and 26.

Although only one embodiment of the invention is shown in the drawings and described in the foregoing specification, it will be understood that invention is not limited to the specific embodiment described, but is capable of modification, rearrangement, and substitution of parts and elements without departing from the spirit of the invention.

What is claimed is:

1. The method of controlling the cyclic restarting of a start-stop receiving instrumentality comprising the steps of:

(a) causing the stopping of the receiving instrumentality at the end of a cycle of operation of the instrumentality, (b) maintaining the receiving instrumentality in the stopped condition beyond the duration of a normal stop signal in the absence of such signal, and (c) restarting the instrumentality only in response to a transition of the incoming signal from the signal condition used for a stop signal to another signal condition occurring no earlier than the end of a normal stop signal.

2. The method of controlling the cyclic restarting of a start-stop receiving instrumentality responsive to start-stop signals wherein the start signals are of a first type and the stop signals are of a second type comprising the steps of:

(a) locally generating a stop signal of predetermined minimum duration and impressing it upon said receiving instrumentality at the end of each cycle of operation of the instrumentality, (b) prolonging said locally generated stop signal beyond its minimum duration if at the end of said minimum duration the incoming signal is of the first type, and (c) terminating the prolongation of said locally generated stop signal when the incoming signal changes from the first type to the second type.

3. The method of controlling the cyclic restarting of a start-stop receiving instrumentality responsive to start-stop signals wherein the start signals are of a first condition and the stop signals are of a second condition comprising the steps of:

(a) locally generating a stop signal of predetermined minimum duration and impressing it upon said receiving instrumentality at the end of each cycle of operation of the instrumentality;

(b) prolonging said locally generated stop signal beyond its minimum duration if at the end of said minimum duration the incoming signal is of the first condition;

(c) terminating the prolongation of said locally generated stop signal in response to the transition of the incoming signal from the first condition to the second condition; and (d) restarting the receiving instrumentality in response to the transition of the incoming signal from the second condition to the first condition.

4. In a start-stop telegraph receiver, (a) an interval timer activated incident to reception of the last signal of a code combination, (b) means enabled by said interval timer upon activation thereof for impressing a stop signal on said receiver, and (c) means responsive to receipt of a start signal condition by the receiver at the end of the time determined by the interval timer to prolong said stop signal beyond the interval of activation of said interval timer.

5. In a start-stop telegraph receiver, (a) an interval timer activated incident to reception of the last signal of a code combination;

(b) means enabled by said interval timer upon activation thereof for impressing a stop signal on said receiver and for prolonging said stop signal beyond the interval of activation of said interval timer in response to receipt of a start signal condition at the end of the interval determined by the interval timer; and (c) means conditioned by the interval timer upon the termination of the interval of its activation and responsive to receipt of a stop signal condition for ending the prolongation of the impressed stop signal.

6. In a start-stop telegraph receiver, (a) an interval timer activated incident to reception of the last signal of a code combination;

(b) a bistable multivibrator, enabled by the interval timer upon activation of the timer, which impresses a stop signal on the receiver and which is controlled by receipt of a start signal condition at the end of the interval determined by the interval timer to prolong said stop signal beyond the interval of activation of the interval timer; and (c) means conditioned by the interval timer upon the termination of the interval of activation of the interval timer and controlled by receipt of a stop signal condition to disable the bistable multivibrator.

7. In a start-stop telegraph receiver, (a) an interval timer having a timing state and an idle state and activated incident to reception of the last signal of a code combination;

(b) a bistable multivibrator, enabled by the internal timer upon activation of the timer, which impresses a stop signal on the receiver and which is responsive to receipt of a start signal condition when the timer changes from the timing state to the idle state to prolong said stop signal beyond the interval of activation of the interval timer; and (c) a gate conditioned by the idle state of the interval timer to disable the bistable multivibrator in response to receipt of a stop signal condition.

8. In a start-stop telegraph receiver, (a) an interval timer having a timing state and an idle state and activated incident to reception of the last signal of a code combination;

(b) a bistable multivibrator which impresses a stop signal on the receiver in response to activation of the timer;

(c) a gate conditioned by a marking state of the incoming signal and disabling the bistable multivibrator when the interval timer changes from its timing state to its idle state; and (d) a gate conditioned by the idle state of the interval timer to disable the bistable multivibrator in response to a change of the incoming signal from a spacing state to a marking state.

9. In a start-stop telegraph receiver operating from a telegraph line and containing a monostable multivibrator for developing a timed interval at the end of a character cycle, (a) a bistable multivibrator enabled by the monostable multivibrator when the monostable multivibrator assumes its quasi-stable state, the bistable multivibrator providing a stop signal inserted into the input of the receiver while said bistable multivibrator is in its enabled condition;

(b) a first gate for passing a first disabling signal to the bistable multivibrator from the monostable multivibrator when the monostable multivibrator assumes its stable state, said first disabling signal passing through said first gate only if the telegraph line is in the marking state when the monostable multivibrator assumes its stable state; and (c) a second gate for passing a second disabling signal to the bistable multivibrator upon the change of the telegraph line from the spacing state to the marking state only if the monostable multivibrator is in its stable state when the telegraph line changes from the spacing state to the marking state.

10. In a start-stop telegraph receiver operating from a telegraph line and containing a monostable multivibrator for developing a timed interval at the end of a character cycle, (a) a bistable multivibrator enabled by the monostable multivibrator when the monostable multivibrator assumes its quasi-stable state;

(b) a first gate for passing a first disabling signal to the bistable multivibrator from the monostable multivibrator when the monostable multivibrator assumes its stable state, said first disabling signal passing through said first gate only if the telegraph line is in the marking state when the monostable multivibrator assumes its stable state;

(c) a second gate for passing a second disabling signal to the bistable multivibrator upon the change of the telegraph line from the spacing state to the marking state only if the monostable multivibrator is in its stable state when the telegraph line changes from the spacing state to the marking state; and (d) a third gate combining the signal of the telegraph line with the output of the bistable multivibrator whereby whenever the telegraph line is in its marking state or the bistable multivibrator is in its enabled state, the telegraph receiver will not begin a character cycle.

No references cited.

JOHN W. CALDWELL, *Acting Primary Examiner.*

R. K. ECKERT, *Assistant Examiner.*